Dec. 18, 1962 K. B. DAY, JR 3,069,568

SYNCHRONIZATION OF PHASE OF (DIVIDING) COUNTER OUTPUT PULSES BY CONTINUALLY RESETTING COUNTER WITH DATA PULSES

Filed March 6, 1961 2 Sheets-Sheet 1

(PULSE GENERATOR 18)

(BINARY TRIGGER)

INVENTOR

KELLY B. DAY, JR.

BY Delbert C. Thomas

ATTORNEY

SYNCHRONIZATION OF PHASE OF (DIVIDING) COUNTER OUTPUT PULSES BY CONTINUALLY RESETTING COUNTER WITH DATA PULSES

Filed March 6, 1961 2 Sheets-Sheet 2

United States Patent Office 3,069,568
Patented Dec. 18, 1962

3,069,568

SYNCHRONIZATION OF PHASE OF (DIVIDING) COUNTER OUTPUT PULSES BY CONTINUALLY RESETTING COUNTER WITH DATA PULSES

Kelly B. Day, Jr., Poughkeepsie, N.Y., assignor to International Business Machines Corporation, New York, N.Y., a corporation of New York Filed Mar. 6, 1961, Ser. No. 93,441
5 Claims. (Cl. 307—88.5)

This application relates to a clock system for a tape reading and recording machine and more particularly to a normally free running clock whose phase may be incrementally controlled to maintain synchronism between the clock pulses and incoming data signals.

Synchronizable clock systems for data systems are known and generally fall into two types, either a complicated and expensive constant frequency system with provisions for precise adjustment of clock phase or a simple multivibrator type which is difficult to set at a desired frequency and is subject to frequency drift due to aging effects, temperature variations and the like. In high speed tape machines which read data serially for conversion to a parallel form, an accurate clock system is required but precise phase adjustment is not a necessity since the clock pulses occur some time after a data pulse and are used to transfer the data signals into a parallel storage device. For such machines, the phase of the clock pulse need not be controlled with great accuracy and phases within about one-sixteenth of a cycle of the correct timing will be satisfactory. Such a clock system with accurate frequency control but only incremental phase adjustment will be considerably less expensive than one having complete phase adjustment and will be much more accurate and stable than a controlled multivibrator type.

It is then an object of the present invention to produce a clock system which is constant in frequency and may have its phase incrementally adjustable to maintain the clock substantially in synchronism with input signals which may not be wholly uniform in timing.

It is also an object to provide a clock system which will normally provide pulses at fixed intervals and which may have its phase adjusted by each incoming data signal to maintain the clock synchronized with the data source.

A further object is to provide a clock system supplying clock pulses at uniform intervals to transfer "zeros" to an output device so long as no digit signals are received from the tape source and which will have its output phase readjusted by each signal representing a "one" to thereafter provide clock pulses for transfer of "zeros" at the same uniform intervals but in a phase synchronized with the last "one" signal.

A still further object is the provision of a clock system having a free running oscillator operating at a multiple of the nominal frequency of the data signals and a frequency dividing counter to reduce the oscillator frequency to that of the data signals together with a data signal controlled device to reset the counter by each significant data signal, i.e., a "one" pulse, to maintain the counter output signal in a fixed phase relationship with the last incoming data signal.

In accordance with the above objectives, a crystal controlled oscillator is provided to generate a high frequency signal which is reduced by a cycling counter to pulses at a nominal data frequency. The counter output pulses are used to transfer to a using machine, indications that no significant data signal was received during the last data interval. Each significant data signal controls its own transfer to the using machine and also resets the counter to a starting value so that succeeding counter output pulses will begin at the correct time intervals after the significant data signal.

A synchronizable clock system of this type is needed for tape reading apparatus where only the "one" signals are received from the tape reading head and "zero" signals must be generated at the proper time since, due to tape stretching or shrinkage, slippage or slight speed variations, the data signals are not uniform in time and may be received slightly before or after their nominal time. The disclosed clock system satisfactorily provides the required signals without an expensive frequency controlled stable oscillator or one having a precision phase control since it utilizes a relatively inexpensive stable oscillator and a controlled counter type of frequency divider.

The foregoing and other objects, features, and advantages of the invention will be apparent from the following more particular description of a preferred embodiment of the invention as illustrated in the accompanying drawings.

The clock system of this disclosure is maintained in synchronism with information signals read from a tape and will inject "zero" data bits into the using system whenever the incoming signal does not have a "one" signal at a data bit position. The clock system comprises a counter driven by a stable oscillator to generate a clock pulse each time the counter returns to a zero reading. Any "one" signal in the input signal will turn on a trigger circuit to set the counter to a predetermined number and hold it in that condition. After passing through a delay circuit the same "one" signal turns the trigger off to allow the counter to resume counting oscillator cycles. The delayed "one" signal also controls entry of the "one" signal into the proper denominational position of a word assembling register.

When the lack of a signal in a data bit interval indicates that the data bit for the corresponding denominational position is a "zero," the pulse from the counter actuates the word assembling register to shift denominations without a data entry, thus, in effect, entering a zero in that denomination.

Figure 1:
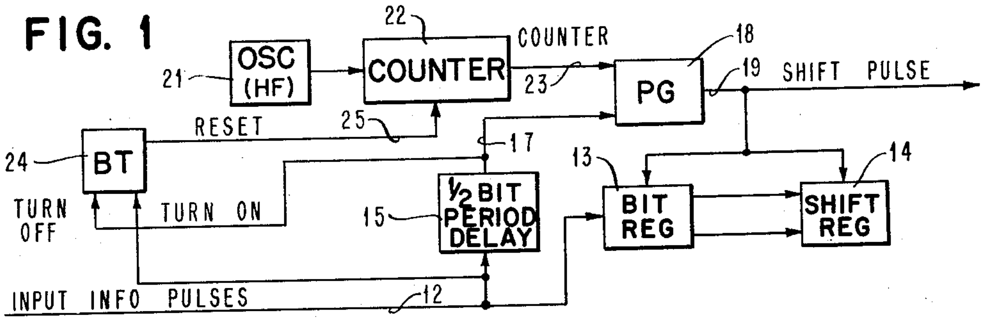
FIGURE 1 is a block diagram of the disclosed clock system.

More specifically, the data signals consisting of discrete pulses or groups of pulses representing "ones" separated by blank spaces representing one or more "zeros" are received on a line 12, FIGURE 1, and are temporarily stored individually in a bit register 13 which is substantially a settable trigger circuit. The timing control to shift the "ones" from bit register 13 into a shift register 14, which may be of the type shown in U.S. Patent 2,580,771, issued January 1, 1952 to Leonard R. Harper or a similar type of shift register, includes a delay circuit 15 to receive the "one" signal and delay it for a time of about one-half of the nominal pulse interval. The output line 17 of delay 15 is connected to one input terminal of an OR pulse generating gate 18 whose output line 19 is thereby energized to reset bit register 13 and to transfer the bit into shift register 14.

When a "zero" is present on line 12, line 17 is not energized and the shift pulse must be otherwise provided to change denominations in shift register 14. An oscillator 21 having a frequency output which is a multiple, preferably 8, 16, or 32, of the nominal input pulse frequency, feeds the units order of a binary counter 22 having 3, 4, or 5 orders as determined by the frequency multiple of the oscillator 21. The highest denomination of counter 22 will reset to zero every 8, 16, or 32 oscillator pulses as determined by the number of counter stages and will provide a pulse on line 23 which is connected to another input of OR gate 18. The resulting pulses on line 19 will be the shift pulses for "zero" signals on input line 12.

Since the input signals on line 12 are derived from a tape, the "one" signals may vary slightly in time of occurrence due to slippage, tape stretching or similar factors, it is desirable to have counter 22 reset to a starting count whenever a "one" signal is received on line 12 so that the counter output pulses will be kept in synchronism with the data signals. For this purpose, a trigger 24 is connected by a line 25 to the counter 22. Trigger 24 is settable to an "on" state by each "one" pulse on line 12 and will be reset "off" by the same pulse after it has passed through delay 15. When trigger 24 is "on," it applies a voltage through line 25 to the reset terminal of counter 22 to hold counter 22 at a start reading so that when trigger 24 is reset, the counter will start counting in the correct phase. In one tape reading machine utilizing the herein disclosed clock system, it was found that inherent circuit delays required that the counter start at a count of "four" for correct timing of the counter shift pulses with relationship to the "one" inputs but obviously the counter may be reset to any starting count required for the particular machine with which it will be used.

Figure 3:
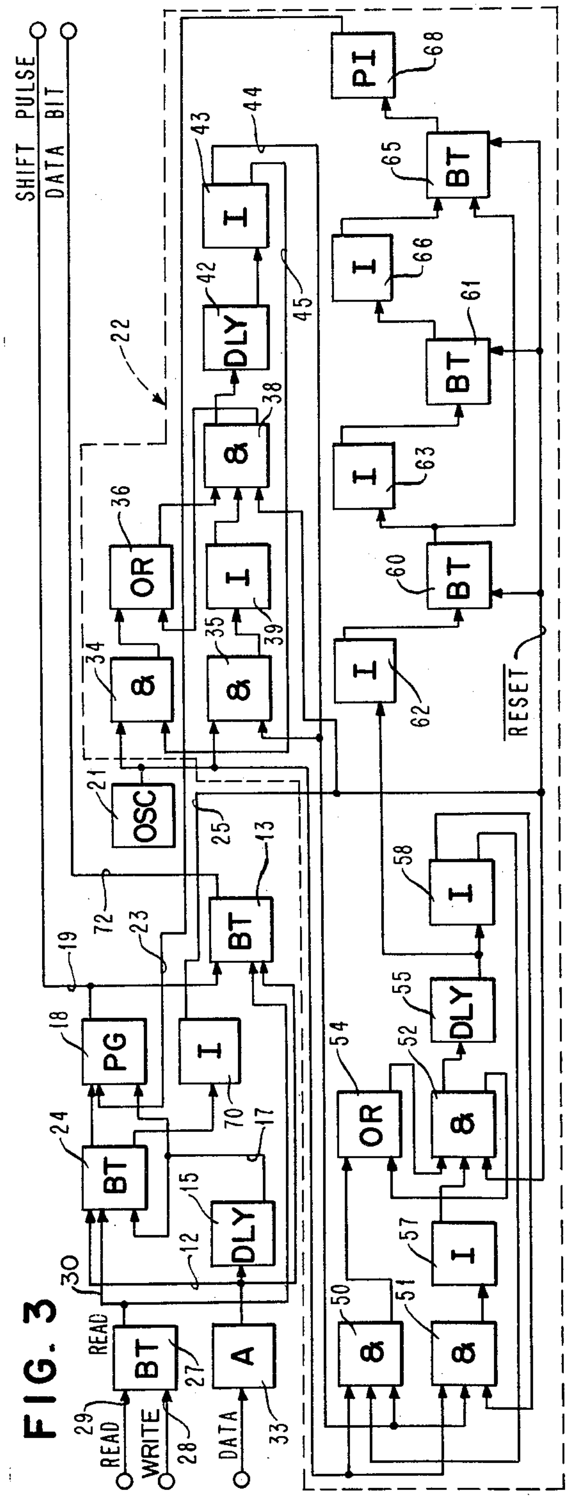
FIGURE 3 is a diagram of the connection of the logical blocks of the clock counter system.

The clock system as more particularly detailed in FIGURE 3 is either set for free running in recording operations or placed under control of the data signals by a binary trigger 27. A write control line 28 is energized to turn the trigger "off" and a read control line 29 may be activated to turn the trigger "on" and supply a gating voltage on the trigger output line 30 to enable operation of trigger 24 and the bit register trigger 13 by the data signals which are applied to line 12 through an amplifier 33.

The counter circuit as shown in FIGURE 3 comprises two high speed binary stages and two slower denominations for an overall frequency division of 16. The output of oscillator 21 is applied as an input to two AND gates 34 and 35. The output of the gate 34 is one input of an OR gate 36 whose output is an input of another AND gate 38. The output of AND gate 35 is passed through an inverter 39 to another input of AND gate 38. The normal in-phase, output of AND gate 38 is returned as an input of OR gate 36. Gates 36 and 38 form a bi-stable trigger pair which will retain either a conducting or a non-conducting state. In operation, starting with both gates 36 and 38 in non-conducting condition, a pulse from oscillator 21 through gate 34 will pass through gate 36 to an input of gate 38. The other inputs of gate 38 are normally at the signal level and gate 38 will pass the signal to its output. This output signal of gate 38 is returned to an input of gate 36 and serves to maintain the gate 36 conducting to hold the input signal on gate 38. The trigger pair is reset to the original non-conducting state by the next oscillator pulse which appears as an output signal from gate 35, whose lower input is raised when gate 38 is conducting. This output signal is effective in inverter 39 to drop the signal level on the center input of gate 38 and thereby block the gate 38. The output voltage of gate 38 then drops to remove the active input signal on gate 36 so that when the output of gate 35 drops, the raising of the output of inverter 39 will not set the trigger pair back into the conducting state.

Gate 38 also has a complementary output which is passed through a short time delay 42 to an inverter 43 having an inverted output 44 connected to an input of gate 35 and an in-phase output 45 connected to an input of gate 34. When gates 36 and 38 are not conducting line 45 is at a control level and a pulse from oscillator 21 will pass through gate 34 to turn the trigger pair on. With gates 36 and 38 conducting, line 44 is brought to the control level and the next oscillator pulse will be passed through gate 35 to turn the trigger pair 36, 38 off to the original non-conducting state.

The second counter stage is substantially a duplicate of the above first stage and comprises three AND gates 50, 51 and 52, an OR gate 54, a delay line 55 and the two inverter blocks 57 and 58. The difference from the first stage is that the input AND gates 50 and 51 have an additional input from line 44 of the first stage and are therefore permited to pass oscillator pulses only when the trigger pair of the first stage is conducting and line 44 is at the control level. Input gates 50 and 51 are thus responsive only to alternate pulses of the oscillator output and the output of this counter stage will be at one-quarter of the oscillator frequency.

Figure 5:
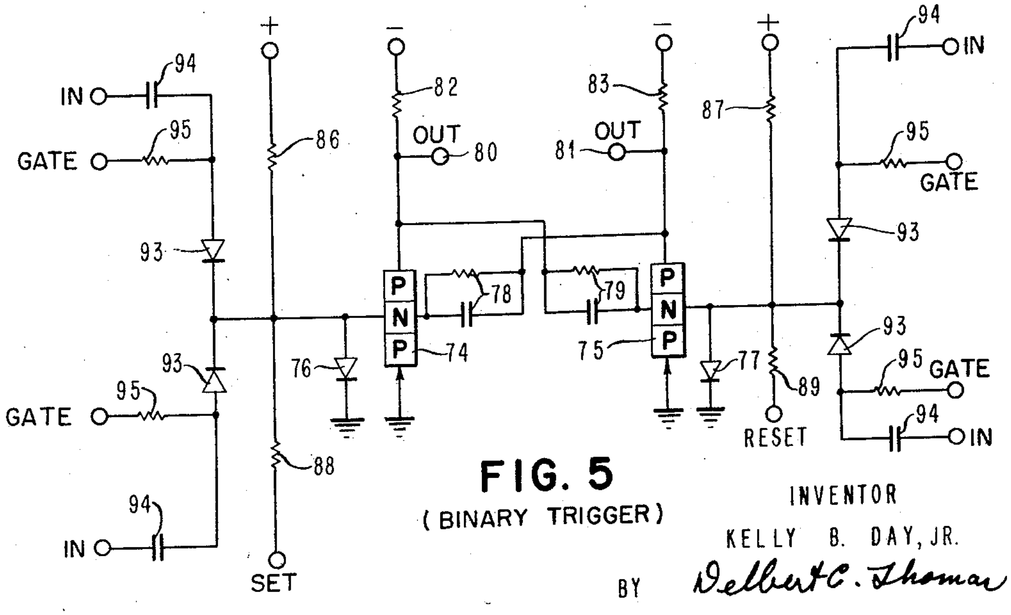
FIGURE 5 is the schematic circuit of the binary triggers.

The two slower speed denominations comprise binary triggers 60 and 61 each with a circuit as shown in FIGURE 5. Trigger 60 is shifted from either of its two stable states to the other state by each signal through an inverter 62 from the output of delay line 55. The output of trigger 60 which is at one-eighth of the oscillator frequency, passes through an inverter 63 to the input of trigger 61 whose output will be at one-sixteenth of the oscillator frequency. Another trigger 65 is utilized as an output pulse former and is turned on by the output of trigger 61 through an inverter 66 so that trigger 65 is turned on when trigger 61 turns "off" and indicates a "0" reading. Trigger 65 has its "off" control input connected directly to the output of trigger 60 to turn the trigger "off" when trigger 60 first turns "on" to indicate a count of four. The turning of trigger 60 to "on" at the count of twelve is ineffective since trigger 65 is off at this time. Thus the combination of the two inputs to trigger 65 turns the trigger "on" for the first four counts and "off" for the remaining period. The output of trigger 65 is amplified in a power inverter 68 and the amplified signal is applied as one of the inputs of the OR pulse generator 18.

As previously noted, trigger 24 controls the reset of the counter 22 to a starting number and is set to an "on" condition by each data signal on line 12 and is reset by the same data signal after a delay. When trigger 24 is "on" the voltage of its lower output line goes to an active level which for the present disclosure may be considered the ground level. This voltage controls an inverter 70 to drop the voltage of the inverter output line 25 to a negative level. Line 25 is connected as an input to AND gates 38 and 52, to the set terminal of trigger 60 and to the reset terminals of triggers 61 and 65. So long as trigger 24 is "off," the more positive voltage on line 25 primes gates 38 and 52 and has no effect on triggers 60, 61 and 65. When trigger 24 is "on," the negative voltage of line 25 will block AND gates 38 and 52 to prevent conduction in either trigger pair and will force trigger 60 to the set state and triggers 61 and 65 to the reset state. The upper output line of trigger 24 is applied to pulse generator 18 as a gating input for the clock pulses and being at a negative level when trigger 24 is "on," will prevent resetting noise pulses on line 23 from triggering the generator 18 during counter resetting. The output pulses of generator 18 are distributed by line 19 to the shift register 14, FIGURE 1, and to the reset terminal of bit register 13 to pulse the data bit line 72 when a data signal has set bit register 13 during the preceding data interval.

Figure 2:
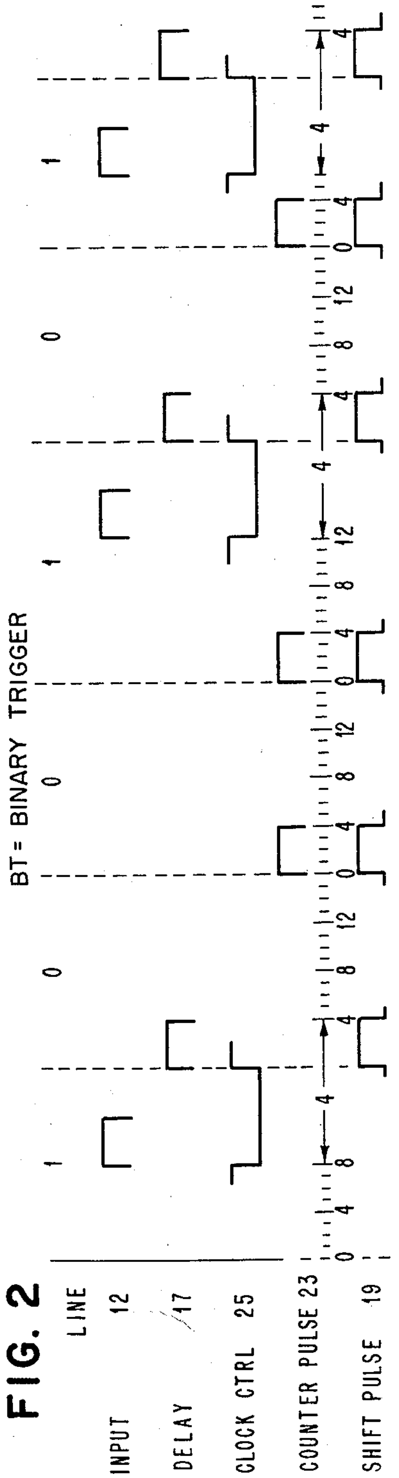
FIGURE 2 is a timing chart of the signals throughout the system.

Referring to the timing diagram of FIGURE 2, it may be seen that in the first bit period, left of diagram, receipt of a data pulse on line 12 immediately turned on the clock control trigger 25 and reset the counter 22 to a count of four. The counter is held at this count until the data pulse through delay 15 appears on line 17 about one-half of a data interval later. The pulse on line 17 resets the trigger 24 to release counter 22 for operation and triggers pulse generator 18 to send out a shift pulse on line 19 to reset the bit register 13 which was set by the data pulse. During the next interval, no pulse is received on line 12 and the counter continues to run and will reset to zero after the fifteenth count. Such resetting of counter 22 will cause appearance of a pulse on line 23 to trigger generator 18 to send out another shift pulse on line 19.

The third period likewise has no pulse on line 12 and when counter 22 resets to zero at the end of this period, it will again cause trigger 18 to generate a shift pulse. In the fourth period, a late data pulse is received in the period at a counter reading of 12. Counter 22 is, however, reset to the same starting count of four by trigger 24 and when freed to count will start emitting clock pulses based on the timing of the data pulse of the fourth period. In the sixth period, a data pulse is received early in the period and resets the counter before the usual reset point. The delayed data pulse will, however, start the counter going again at the normal starting count and the counter pulses will still be emitted at uniformly spaced times after the shift pulse triggered by the last data pulse. Thus the counter controlled shift pulses will always be started one nominal bit period after the last shift pule triggered by a received data bit. The counter will maintain proper synchronism of the clock pulses for the "zero" bits in the incoming data so long as the synchronizing "one" bits are received within the range of counter reading from about 5 to 14 for a four stage binary counter.

The AND, OR, and inverter logic blocks of FIGURES 1 and 3 are preferably of the current switching type described in detail in assignee's Patent 2,964,652, issued December 13, 1960 to H. S. Yourke to which reference may be made for a more detailed description. The binary triggers 13, 24, 27, 60, 61 and 65 may be of any suitable type but are preferably as shown in FIGURE 5, which triggers are compatible with the other preferred logical elements. In this circuit a pair of PNP transistors 74 and 75 have their emitters connected to ground and their bases connected individually to ground through diodes 76 and 77 to prevent application of an appreciable positive voltage to the bases. Each base is connected by a parallel resistance-capacitance circuit 78 or 79 to the collector of the other transistor, and each collector is connected to an output terminal 80 or 81 and through its resistor 82 or 83 to a source of negative voltage. Each base is connected through its resistor 86 or 87 to a positive voltage source and through another resistor 88 or 89 to a set or a reset terminal. This circuit has the usual two stable states with one transistor conducting and the other non-conducting. The voltage dividers formed by resistors 86, 78 and 83 and by 87, 79 and 82 maintain a negative voltage on the base of the conducting transistor and a ground voltage at the base of the non-conducting one. Either transistor may be set or maintained conducting by application of a negative D.C. voltage to the terminal connected to its base and in FIGURE 3 such connections are shown entering the bottom of the logic block.

For pulse setting of the trigger to a desired state or for switching from either state to the other, each transistor, 74, 75 has the cathodes of one or more diodes 93 connected to its base. The anode of each diode 93 is connected to one end of a capacitor 94 and to a gate resistor 95. The other ends of gate resistors 95 are normally held at a slight negative potential to enable trigger operation but may be energized by a substantial negative potential, e.g., by line 30, FIGURE 3, to block operation of the trigger by a pulse through its associated capacitor 94. Functionally, if transistor 74 is conducting, a positive pulse through a capacitor 94 will raise the base voltage of the transistor to ground and turn off transistor 74 which will turn on transistor 75 in the conventional manner. A later positive pulse through a capacitor 94 for the base of transistor 75 will turn 75 off and turn transistor 74 back on. When a negative voltage greater in magnitude than the peak of the positive pulse is connected to the free end of the resistor 95 for any capacitor 94, then the positive pulse cannot raise the anode of its diode 93 to a more positive voltage than the cathode voltage and the pulse will have no switching effect. When alternate switching of transistors 74 and 75 in response to pulses on a single input line is required, the input line may be connected to one capacitor 94 for each base and will act to turn off the conducting one of the transistors, the positive pulse to the base of the non-conducting transistor being bypassed to ground through diode 76 or 77 and having no effect. In FIGURE 3, the lead for such a connection to both bases is shown emerging from the center of the left side of the logic block while a connection to only one base is shown in the upper or lower part of the left side with an associated gating connection to resistor 95 where required.

Figure 4:
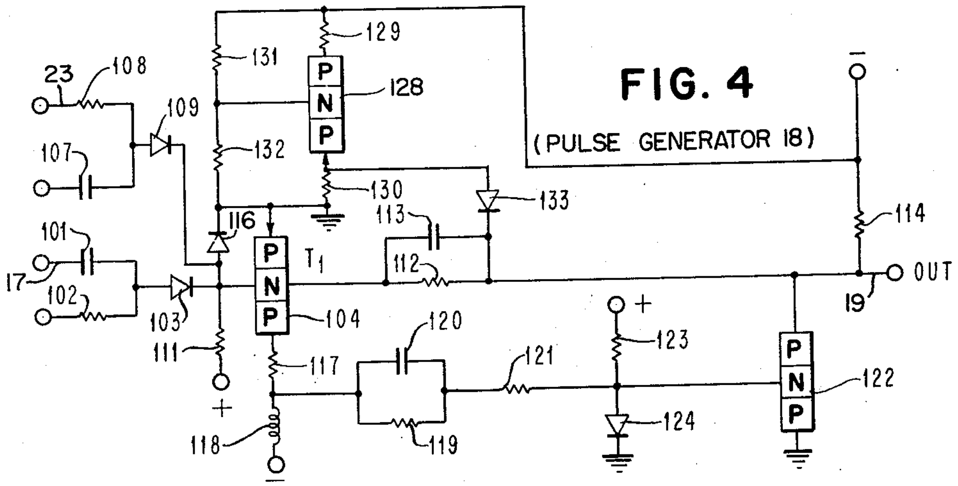
FIGURE 4 is the schematic circuit of a pulse generator.

The circuit diagram for pulse generator 18 is shown in FIGURE 4 where a capacitor 101 and a gate resistor 102 are each connected at one end to the anode of a diode 103 having its cathode connected to the base of a transistor 104 as a gated input similar to those described in relation to the binary trigger of FIGURE 5. A second capacitor 107, resistor 108 and diode 109 form a second gated input to the base of transistor 104. A series circuit of a resistor 111 from a positive voltage to the base of transistor 104, a resistor 112 bypassed by a capacitor 113 and another resistor 114 to a negative voltage normally apply a negative bias to the base to keep transistor 104 conducting until a positive pulse passes through a capacitor 101 or 108 to turn it off. The emitter of transistor 104 is connected to ground and a diode 116 from the base to ground will bypass any appreciable positive voltage on the base. The collector of 104 is connected through resistor 117 and an inductor 118 to a negative voltage. Application of a positive pulse to the base of transistor 104 will turn it off which causes a negative pulse to appear at the junction of resistor 117 and inductor 118. This negative pulse passes through a resistor 119, bypassed by a capacitor 120, and a resistor 121 to the base of a second transistor 122. A resistor 123 connected to a positive voltage and a diode 124 connected to ground normally apply a slight positive voltage to the base of transistor 122 to hold the transistor non-conducting but the negative spike from the inductor 118 when transistor 104 turns off will turn on transistor 122 for an interval determined by the time constants of the inductor 118 and resistors 119 and 121 discharging through the base emitter junction of transistor 122. The emitter of transistor 122 is grounded and its collector is connected to the junction of resistors 112 and 114 so that while the transistor is conducting, it holds the base of transistor 104 at the non-conducting voltage.

A third transistor 128 is used to fix the negative voltage level at the collector of transistor 122. A resistor 129 from the negative voltage to its collector and another resistor 130 from its emitter to ground pass the current through transistor 128 while the negative voltage level is set by a pair of resistors 131 and 132 connected in series between ground and the negative voltage and having their junction point connected to the base of transistor 128. A diode 133 from the emitter of transistor 128 to the collector of transistor 122 prevents the collector from going to a more negative voltage than the level determined by transistor 128 and stabilizes the operating point of transistor 104. In operation, a positive pulse through an input capacitor 101 or 107 will turn off transistor 104 which will turn on transistor 122 for a predetermined interval. Transistor 122 will hold transistor 104 off until the voltage pulse at the base of 122 is dissipated and the base of transistor 104 reaches a conduction value. Start of conduction in transistor 104 will, through feedback to transistor 122, cause a fast switching of the transistors to their normal state.

While the invention has been particularly shown and described with reference to a preferred embodiment thereof, it will be understood by those skilled in the art that the foregoing and other changes in form and details may be made therein without departing from the spirit and scope of the invention.

In the claims:

1. A synchronizable clock pulse generator for a data processing system responsive to sequential binary data representing pulses, said generator developing a series of equally spaced pulses starting at a fixed interval after receipt of each significant data pulse and comprising: a device settable by a significant data pulse, means to reset said settable device at the end of a predetermined time period, a gate actuated by said reset means to produce a clock pulse when said settable device is reset to a normal condition, a source of signals bearing a harmonic relationship to the nominal frequency of said data pulses, a counter responsive to the signals of said source to produce equally spaced pulses at said nominal frequency, a counter reset control lead energizable by said settable device when set to force said counter to hold a predetermined count and a circuit to conduct said counter output pulses to an input of said gate.

2. A synchronizable clock pulse generator for a data processing system responsive to sequential binary data representing pulses, said generator producing a series of equally spaced pulses starting at a fixed interval after receipt of each significant data pulse and comprising: a bistable device settable by a significant data pulse, a pulse generating gate, a delay line to apply said significant data pulse to reset said bistable device after a fixed interval and to simultaneously energize said pulse generating gate to produce a clock pulse at said fixed interval after said significant data pulse, a signal generator operable at a frequency which is a multiple of the nominal frequency of said data representing pulses, a recycling counter responsive to the output of said signal generator to produce an output pulse at each occurrence of a predetermined count therein, a connection to apply said counter output pulses to said gate to generate additional clock pulses and a control circuit from said bistable device to said counter to force said counter to a second predetermined count for so long as said bistable device is set whereby said gate is controlled to produce trains of equally spaced clock pulses with each train starting at a predetermined interval after a significant data signal.

3. A clock pulse generator for a data processing machine to produce clock pulses synchronizable by each significant data pulse of a serial binary data representing signal, said generator comprising: a signal delaying device, a monostable pulse producing means responsive to each significant data pulse of the delayed signal from said delaying device, a trigger settable by each significant data pulse of said data signal and resettable by said pulse in said delayed signal, a timing signal source operating at a multiple of the nominal frequency of the data pulse intervals in said data signal, a recycling counter responsive to said timing signal to produce an output pulse at each cycle thereof, a reset connection from said trigger to said counter to set said counter to and hold it at a predetermined count while said trigger is set, and a connecting means to apply said counter output pulses to an input of said monostable pulse producing means whereby a train of output pulses is produced by said pulse producing means, the first pulse of said train starting at receipt of each delayed significant data pulse and having a pulse for each succeeding data interval which does not have a significant data pulse.

4. In a data processing system responsive to a data representing signal in serial binary form with each data interval having a pulse only if a corresponding binary bit position of the represented data is a "one," a clock pulse generator to produce a clock pulse for each data interval of said signal, said clock pulses being synchronized with the latest received signal pulse, said generator comprising: a trigger circuit settable to an "on" condition by each pulse of said signal, means to delay said signal for about one half of a data interval, a connection from said delay means to said trigger circuit to turn said circuit "off" by the delayed pulse which set it, means responsive to each output pulse of said delay means to produce a clock pulse, a signal generator producing a plurality of signals during each data interval, a recycling counter responsive to the output of said signal generator to normally generate a pulse for each data interval, a reset circuit activated by said trigger circuit while set to set said counter to a predetermined count and a gate circuit opened by said trigger circuit while "off" to pass said counter generated pulses to said clock pulse generating means.

5. A data processing system having a clock pulse generating system as set out in claim 4 and including a data pulse storage register settable by a pulse of said data representing signal, a multiple denomination register to retain said data signal in parallel form and circuits operated by each clock pulse to transfer the setting of said pulse storage register into a denomination of said multiple denomination register.

References Cited in the file of this patent

UNITED STATES PATENTS 2,730,617 Marmont ............... Jan. 10, 1956